United States Patent
Bai et al.

(10) Patent No.: US 11,934,314 B2
(45) Date of Patent: Mar. 19, 2024

(54) METHOD TO IMPROVE COPY PERFORMANCE OF CLIENT DRIVE REDIRECTION WITH PER-THREAD MERGED INPUT/OUTPUT

(71) Applicant: VMware, Inc., Palo Alto, CA (US)

(72) Inventors: Wu Bai, Beijing (CN); Haiwei Zhao, Beijing (CN); Weigang Huang, Beijing (CN); Feng Yan, Beijing (CN); Kun Shi, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/901,321

(22) Filed: Sep. 1, 2022

(65) Prior Publication Data
US 2024/0028513 A1    Jan. 25, 2024

(30) Foreign Application Priority Data
Jul. 22, 2022 (WO) ............... PCT/CN2022/107280

(51) Int. Cl.
*G06F 12/0831* (2016.01)
*G06F 12/0891* (2016.01)

(52) U.S. Cl.
CPC ...... *G06F 12/0835* (2013.01); *G06F 12/0891* (2013.01)

(58) Field of Classification Search
CPC .................... G06F 12/0835; G06F 12/0891
See application file for complete search history.

(56) References Cited

U.S. PATENT DOCUMENTS

| 10,162,472 B1* | 12/2018 | Joyce ............... G06F 9/454 |
| 10,656,841 B1* | 5/2020 | Huang ............. G06F 3/0661 |
| 10,929,042 B2* | 2/2021 | Matsui ............ G06F 3/0659 |
| 2015/0220275 A1* | 8/2015 | Oh ................. G06F 3/0679 |
| | | 711/103 |

* cited by examiner

*Primary Examiner* — Nicholas P Celani
(74) *Attorney, Agent, or Firm* — Kim & Stewart LLP

(57) ABSTRACT

A method of copying at least first and second files stored in a client computing device to a host server, includes the steps of: generating at the host server a first read I/O request for data of the first file based on responses to pre-read I/O requests for the first file, received from the client computing device; transmitting a merged I/O request that includes the first read I/O request for data of the first file and pre-read I/O requests for the second file from the host server to the client computing device; generating at the host server a second read I/O request for data of the second file based on responses to the pre-read I/O requests for the second file, received from the client computing device; and transmitting the second read I/O request for data of the second file from the host server to the client computing device.

33 Claims, 12 Drawing Sheets

| File Names Cache 172 ||||
|---|---|---|---|
| No. | Key || Value |
| 1 | Thread ID 200 | Subdirectory Name 202 | File Name 204<br>File Name 206 |
| 2 | Thread ID 210 | Subdirectory Name 212 | File Name 214<br>File Name 216<br>File Name 218 |

Figure 2A

| File Info Cache 174 ||||
|---|---|---|---|
| No. | Key || Value |
| 1 | Thread ID 220 | Query Directory Parameters 222 | Metadata 224 |
| 2 | Thread ID 220 | Query Information Parameters 226 | Metadata 228 |
| 3 | Thread ID 220 | Query Information Parameters 230 | Metadata 232 |
| 4 | Thread ID 220 | Volume Information Parameters 234 | Metadata 236 |
| 5 | Thread ID 240 | Query Directory Parameters 242 | Metadata 244 |
| 6 | Thread ID 240 | Query Information Parameters 246 | Metadata 248 |
| 7 | Thread ID 240 | Query Information Parameters 250 | Metadata 252 |
| 8 | Thread ID 240 | Volume Information Parameters 254 | Metadata 256 |

Figure 2B

| IDs Cache 176 |||||
|---|---|---|---|---|
| No. | Key |||  Value |
| 1 | Thread ID 260 | Open Parameters 262 | Path 264 | ID 266 |
| 2 | Thread ID 260 | Open Parameters 268 | Path 270 | ID 272 |
| 3 | Thread ID 280 | Open Parameters 282 | Path 284 | ID 286 |
| 4 | Thread ID 280 | Open Parameters 288 | Path 290 | ID 292 |

Figure 2C

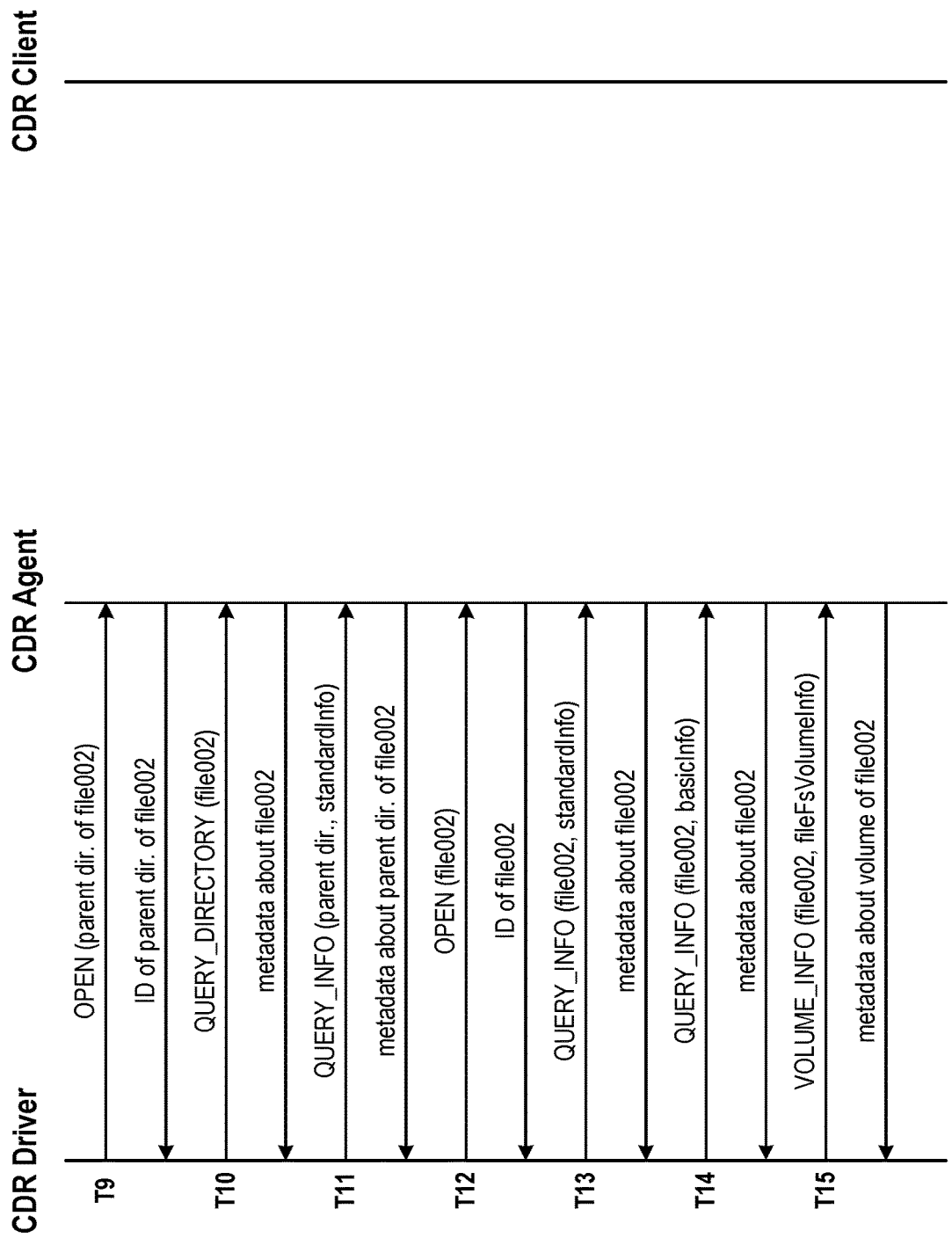

METHOD TO IMPROVE COPY PERFORMANCE OF CLIENT DRIVE REDIRECTION WITH PER-THREAD MERGED INPUT/OUTPUT

CROSS-REFERENCE

This application is based upon and claims the benefit of priority from International Patent Application No. PCT/CN2022/107280, filed on Jul. 22, 2022, the entire contents of which are incorporated herein by reference.

BACKGROUND

Many organizations rely on remote desktop services to provide lean, flexible computing environments. Client drive redirection (CDR) is one important feature required by the end user of a remote desktop service. CDR enables a user of a remote desktop session to share files and directories between a client computing device and a host server. The user designates a directory of the client computing device to be a "shared directory." The shared directory is visible from within the remote desktop session such that the user can see the names of subdirectories and files therein even though the content of the files is stored on the client computing device.

Through the remote desktop session, the user can copy files from the shared directory to a local directory of a file system of the host server. Such copying involves a CDR agent of the host server transmitting a series of input/output (I/O) requests to the client computing device and a CDR client of the client computing device transmitting responses to the host server. For example, if the user selects to copy a subdirectory of the shared directory, the series of I/O requests and responses are divided into a listing phase and a copying phase. During the listing phase, the CDR agent acquires the names of all the files in the subdirectory and creates an ordered list therefrom for the file system of the host server. During the copying phase, the CDR agent acquires the content of the files, which is stored in the local directory of the host server.

During the copying phase, the CDR agent transmits read I/O requests to the client computing device to read the content of the files. In addition to the read I/O requests, the CDR agent transmits several other I/O requests, including requests to open files, open the subdirectory, and query information about the files, the subdirectory, and the volume in which the subdirectory is stored. Because copying includes the transmission of many I/O requests and responses between the client computing device and the host server, the copying is inefficient and often creates a bottleneck in the remote desktop experience.

Copying is especially slow when there is poor network performance between the client computing device and the host server, and copying performance degrades as the number of relatively small files being copied increases. Often times, the copying of a small file does not include as many read I/O requests and responses as the copying of a large file. However, the copying still includes many additional I/O requests and responses, as discussed above, which are largely responsible for the inefficiency. A more efficient method for copying files to a host server via CDR is needed.

SUMMARY

Accordingly, one or more embodiments provide a method of copying at least first and second files stored in a client computing device to a host server that is hosting a remote desktop accessed by the client computing device. The method includes the steps of: transmitting pre-read I/O requests for the first file from the host server to the client computing device; generating at the host server a first read I/O request for data of the first file based on responses to the pre-read I/O requests for the first file, received from the client computing device; transmitting a merged I/O request that includes the first read I/O request for data of the first file and pre-read I/O requests for the second file from the host server to the client computing device; generating at the host server a second read I/O request for data of the second file based on responses to the pre-read I/O requests for the second file, received from the client computing device; transmitting the second read I/O request for data of the second file from the host server to the client computing device, and storing at the host server the data of the first file and the data of the second file, received in response to the first read I/O request and the second read I/O request, respectively.

Further embodiments include a non-transitory computer-readable storage medium comprising instructions that cause a remote desktop system to carry out the above method, as well as a remote desktop system configured to carry out the above method.

BRIEF DESCRIPTION OF THE DRAWINGS

FIG. 2A is a block diagram illustrating an example of a cache of names of files to be copied from a client computing device to a host server.

FIG. 2B is a block diagram illustrating an example of a cache of information about the files to be copied.

FIG. 2C is a block diagram illustrating an example of a cache of identifiers (IDs) of both the files to be copied and directories of the client computing device.

FIGS. 4A-4C are a series of sequence diagrams illustrating an example of transmitting I/O requests and responses between the client computing device and the host server for files to be copied.

DETAILED DESCRIPTION

Techniques for copying files from a client computing device to a host server via CDR are described. The files are copied from a shared directory to a local directory of a file system of the host server. The shared directory stores files of the client computing device, and the host server stores the names of files and subdirectories of the shared directory such that the names are visible to a user via a remote desktop session. According to embodiments, a CDR driver of the host server generates I/O requests, which are handled by a CDR agent of the host server. When the CDR driver generates a read I/O request, the CDR agent generates additional I/O requests that the CDR driver is expected to generate later. The CDR agent then appends the additional I/O requests to the read I/O request, the read and appended I/O requests referred to herein as a "merged I/O request."

The CDR agent transmits the merged I/O request to a CDR client of the client computing device as a single packet. The CDR client then performs each constituent I/O request of the merged I/O request and transmits responses thereto in a single packet. When the CDR agent receives the response to the merged I/O request, also referred to herein as a "merged I/O response," the CDR agent extracts the response to the read I/O request, which includes data of a file to be copied, and the responses to the appended I/O requests. The CDR agent transmits the data of the file to the CDR driver and caches the responses to the appended I/O requests.

Later, the CDR driver generates I/O requests matching the parameters of the I/O requests previously appended to the merged I/O request. In response, the CDR agent retrieves the responses to the I/O requests from caches of the host server and transmits the responses to the CDR driver. Accordingly, the number of packets transmitted between the client computing device and the host server is reduced by the grouping of I/O requests into a single packet as a merged I/O request and the grouping of responses into a single packet. This grouping improves the efficiency of copying via CDR, especially when network performance is poor and when copying a large number of small files. These and further aspects of the invention are discussed below with respect to the drawings.

Figure 1:
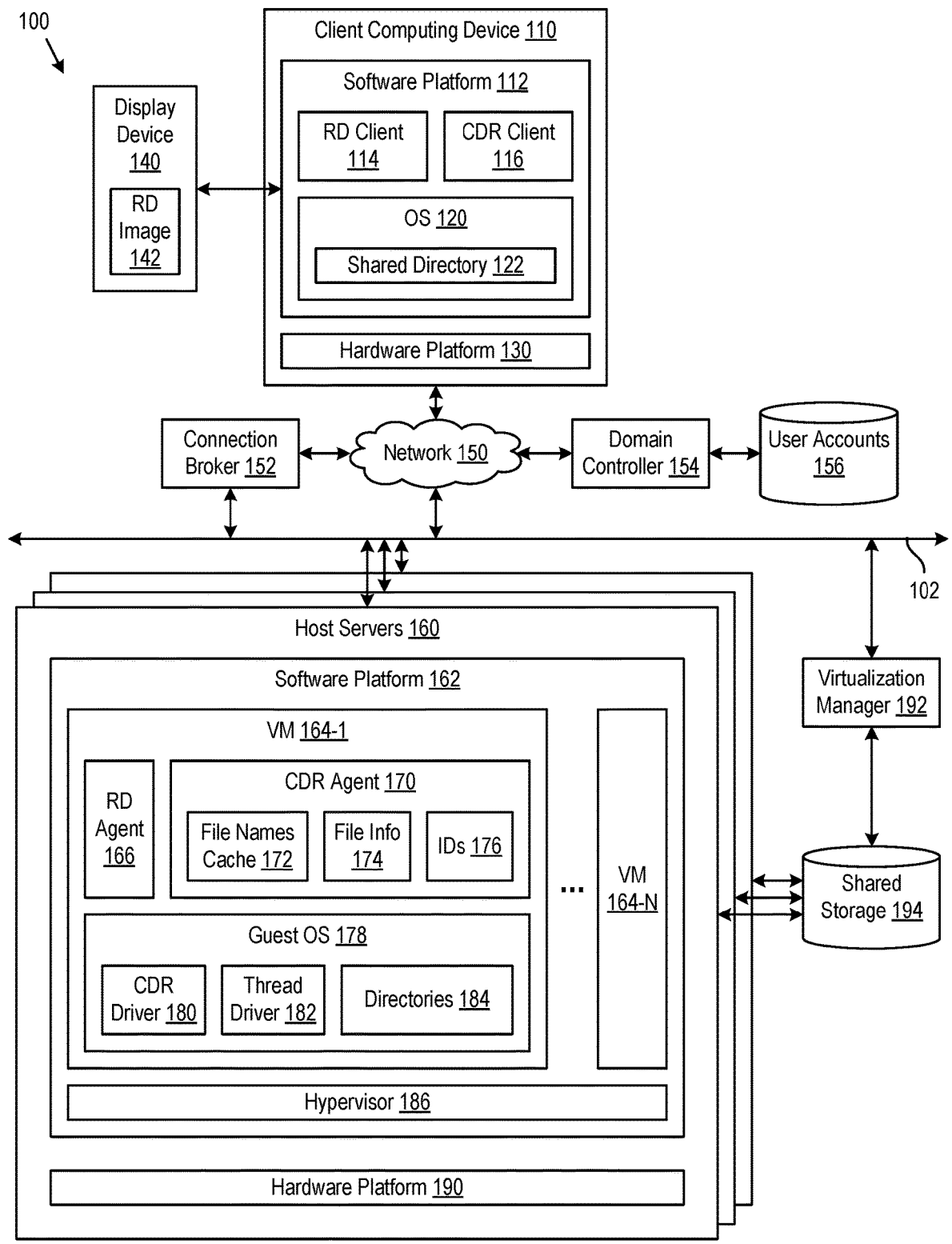
FIG. 1 is a block diagram of a virtualized computer system in which embodiments may be implemented.

FIG. 1 is a block diagram of a virtualized desktop infrastructure (VDI) system 100 (also referred to as a remote desktop computer system) in which embodiments may be implemented. VDI system 100 includes a client computing device 110 and a plurality of host servers 160 that are remote from client computing device 110, e.g., in a remote data center. Client computing device 110 is constructed on a hardware platform 130 such as an x86 architecture platform. Hardware platform 130 includes conventional components (not shown) of a computing device, such as one or more central processing units (CPUs), memory such as random-access memory (RAM), local storage such as one or more magnetic drives or solid-state drives (SSDs), and one or more network interface cards (NICs). The NIC(s) enable client computing device 110 to communicate with host servers 160 over a physical network 150 such as the Internet.

Client computing device 110 includes a software platform 112 on which a remote desktop (RD) client software program 114 and CDR client software program 116 run on an operating system (OS) 120, which is a commodity OS. The term "desktop" refers to the instance of an interactive operating environment provided by an OS and software applications, typically in the form of display and sound output and keyboard and mouse input. With RD client 114, a user accesses an RD that is running in a remote data center, from any location. For example, RD client 114 may be VMware Horizon® client, available from VMware, Inc., or a special purpose thin client such as those available from Dell, HP, NEC, Sun Microsystems, and Wyse.

A virtual machine (VM) in one of host servers 160 transmits an image 142 of the RD to RD client 114, which communicates with a display device 140 such as a monitor on which the user views RD image 142. Additionally, as a feature of the RD, OS 120 manages a shared directory 122, the names of files and subdirectories therein being stored in host server 160 such that the names are visible to the user via the RD. CDR client 116 receives and executes I/O requests from host server 160 regarding the visible files and subdirectories, and CDR client 116 transmits responses to the I/O requests to host server 160.

VDI system 100 includes a domain controller 154 such as Microsoft Active Directory® that manages user accounts 156 including the user's log-in information for the RD. VDI system 100 also includes a connection broker 152 that manages connections between RD client 114 and a VM running the user's RD. Connection broker 152 and domain controller 154 may run on separate servers or in separate VMs running on the same server or different servers.

In embodiments illustrated herein, RDs are running in VMs 164. VMs 164 are instantiated on a plurality of host servers 160, each of which includes a software platform 162 and a hardware platform 190. Hardware platform 190 is, e.g., a server-grade x86 architecture platform including the conventional components of a computing device described above for hardware platform 130. CPU(s) of hardware platform 190 are configured to execute instructions such as executable instructions that perform one or more operations described herein, which may be stored in memory of hardware platform 190. Software platform 162 includes a hypervisor 186, which is a virtualization software layer that supports a VM execution space within which VMs 164 are concurrently instantiated and executed. One example of hypervisor 186 is a VMware ESX® hypervisor, available from VMware, Inc.

Each of host servers 160 is controlled by a virtualization manager 192, and hardware platform 190 of each of host servers 160 is coupled to a shared persistent storage system 194. Virtualization manager 192 logically groups host servers 160 into a cluster to perform cluster-level tasks such as provisioning and managing VMs 164 and migrating VMs 164 from one of host servers 160 to another. Virtualization manager 192 communicates with host servers 160 via a management network (not shown) provisioned from a physical network 102 such as a local area network (LAN) of a remote data center. Virtualization manager 192 may be, e.g., a physical server or one of VMs 164. One example of virtualization manager 192 is VMware vCenter Server®, available from VMware, Inc.

VM 164-1 includes an RD agent software program 166 and a CDR agent software program 170 running on a guest OS 178, which is a commodity OS. Guest OS 178 includes a CDR driver 180 and a thread driver 182. CDR driver 180 generates I/O requests regarding the visible files and subdirectories of shared directory 122. One example of CDR driver 180 is a remote desktop protocol device redirector (RDPDR) driver, available from Microsoft. CDR client 116, CDR agent 170, and CDR driver 180 are also referred to individually and collectively herein as CDR software. Thread driver 182 generates identifiers (IDs) of threads for merged I/O requests, each of the constituent I/O requests being associated with the same thread ID. Guest OS 178 also manages directories 184 in a file system, directories 184 being local directories of host server 160 into which files of shared directories 122 are copied, according to embodiments.

RD agent 166 communicates with RD client 114 to establish a session for the user's RD. RD image 142 is generated in VM 164-1 and transmitted by RD agent 166 to RD client 114 to be displayed on display device 140. CDR agent 170 handles I/O requests generated by CDR driver 180, including generating merged I/O requests therefrom, transmitting I/O requests to CDR client 116, and transmitting responses to I/O requests to CDR driver 180. The I/O requests transmitted to CDR client 116 include: (1) individual I/O requests, also referred to herein as "normal I/O requests," and (2) merged I/O requests generated by CDR agent 170 to include multiple I/O requests.

To handle I/O requests, CDR agent 170 manages a file names cache 172, a file information cache 174, and an IDs cache 176. In file names cache 172, CDR agent 170 stores names of files being copied, as discussed further below in conjunction with FIG. 2A. In file information cache 174, CDR agent 170 stores metadata about files and subdirectories of shared directory 122 and about the volume that includes shared directory 122, as discussed further below in conjunction with FIG. 2B. In IDs cache 176, CDR agent 170 stores IDs of files and subdirectories of shared directory 122, as discussed further below in conjunction with FIG. 2C. A particular configuration of VDI system 100 is illustrated in FIG. 1, but it should be recognized that one or more embodiments may be practiced with other computer system configurations.

FIG. 2A is a block diagram illustrating an example of file names cache 172. CDR agent 170 populates entries of file names cache 172 during a listing phase, as discussed further below in conjunction with FIG. 5. For each key-value entry of file names cache 172, the key includes a thread ID, which is generated by thread driver 182, and a name of a subdirectory of shared directory 122, which is determined from a path targeted by a read I/O request. The key is mapped to a value, the value being an ordered list of names of files in the subdirectory. Filenames cache 172 has a size limit, and when the size limit is reached, entries of file names cache 172 are overwritten with new entries.

In the example of FIG. 2A, the first entry stores the names of two files to be copied: file names 204 and 206. The user has requested each of these two files to be copied as part of a single request, e.g., by "dragging and dropping" the two files via the RD session from shared directory 122 to one of directories 184 or by dragging and dropping a subdirectory that includes the two files. The two files are associated with a thread ID 200, which is generated by thread driver 182 for a merged I/O request. The two files are also associated with a name 202 of a subdirectory of shared directory 122 that includes the two files.

The second entry stores the names of three files to be copied: file names 214, 216, and 218. The user has requested each of these three files to be copied as part of a single request. The three files are associated with a thread ID 210, which is generated by thread driver 182 for another merged I/O request. The three files are also associated with a name 212 of another subdirectory of shared directory 122 that includes the three files.

FIG. 2B is a block diagram illustrating an example of file information cache 174. For each key-value entry of file information cache 174, the key includes a thread ID, which is generated by thread driver 182, and parameters of an I/O request such as an ID of a targeted directory or file, the I/O request being generated by CDR agent 170 and appended to a read I/O request. The key is mapped to a value, the value being metadata, which is returned by CDR client 116 in response to the appended I/O request.

For example, the appended I/O requests include "query directory" I/O requests, which request metadata about a file of a particular subdirectory of shared directory 122. Such appended I/O requests also include "query information" I/O requests, which request metadata about a particular file or a particular directory. Query directory and query information I/O requests may be for "basic information" such as the creation time of a file, "standard information" such as the number of bytes allocated to a file, and "attribute information" such as whether a file is read-only. Such appended I/O requests also include "volume information" I/O requests, which request information about the volume in which a file or subdirectory is stored such as the capacity of the volume.

In the example of FIG. 2B, the first four entries are associated with a thread ID 220, which is generated by thread driver 182 for a merged I/O request. The first entry includes parameters 222 of a query directory I/O request along with metadata 224 as a response to the request. The second entry includes parameters 226 of a query information I/O request such for basic information, along with metadata 228 as a response to the request. The third entry includes parameters 230 of a query information I/O request such as for standard information, along with metadata 232 as a response to the request. The fourth entry includes parameters 234 of a volume information I/O request along with metadata 236 as a response to the request.

The next four entries are associated with a thread ID 240, which is generated by thread driver 182 for another merged I/O request. The fifth entry includes parameters 242 of a query directory I/O request along with metadata 244 as a response to the request. The sixth entry includes parameters 246 of a query information I/O request such for basic information, along with metadata 248 as a response to the request. The seventh entry includes parameters 250 of a query information I/O request such as for standard information, along with metadata 252 as a response to the request. The eighth entry includes parameters 254 of a volume information I/O request along with metadata 256 as a response to the request.

FIG. 2C is a block diagram illustrating an example of IDs cache 176. For each key-value entry of IDs cache 176, the key includes a thread ID, parameters of a "create" I/O request such as a "ShareAccess" flag indicating whether multiple threads of execution should be allowed to access a file or directory targeted by the create I/O request, and a path to the targeted file or directory. The thread ID is generated by thread driver 182, and the create I/O request is generated by CDR agent 170 and appended to a read I/O request. The key is mapped to a value, the value being an ID of the targeted file or directory, which is returned by CDR client 116 in response to the appended create I/O request. Create I/O requests are I/O requests to either open an existing file or directory or to create a new file or directory. Such create I/O requests are also referred to herein as "open I/O requests" when used for opening existing files and subdirectories of shared directory 122. The responses to such open I/O requests include IDs of the existing files and subdirectories.

In the example of FIG. 2C, the first two entries are associated with a thread ID 260, which is generated by thread driver 182 for a merged I/O request. The first entry also includes parameters 262 of an open I/O request, e.g., for a subdirectory of shared directory 122, a path 264, e.g., to the subdirectory, and an ID 266 as a response to the request. The second entry also includes parameters 268 of an open I/O request, e.g., for a file of the subdirectory, a path 270, e.g., to the file of the subdirectory, and an ID 272 as a response to the request.

The next two entries are associated with a thread ID 280, which is generated by thread driver 182 for another merged I/O request. The third entry also includes parameters 282 of an open I/O request, e.g., for another subdirectory of shared directory 122, a path 284, e.g., to the other subdirectory, and an ID 286 as a response to the request. The fourth entry also includes parameters 288 of an open I/O request, e.g., for a file of the other subdirectory, a path 290, e.g., to the file of the other subdirectory, and an ID 292 as a response to the request.

Figure 3A:
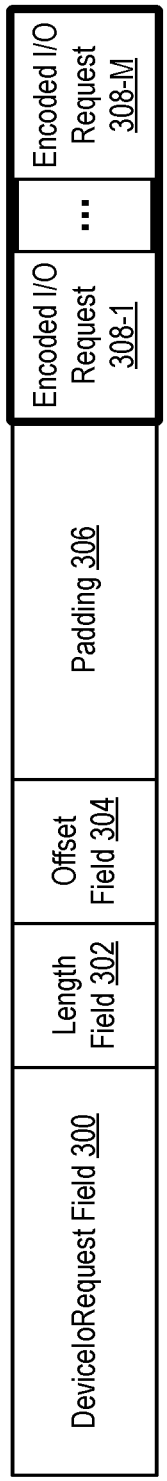
FIG. 3A is a block diagram illustrating a "merged I/O request," including a read I/O request and additional appended I/O requests, according to embodiments.

FIG. 3A is a block diagram illustrating a merged I/O request, according to embodiments. In the example of FIG. 3A, CDR driver 180 generates a read I/O request including three fields: a "deviceIoRequest" field 300, a "length" field 302, and an "offset" field 304. DeviceIoRequest field 300 stores header information of the read I/O request such as an ID of shared directory 122. Length field 302 stores the number of bytes to be read, and offset field 304 stores an offset of the file to begin reading at. The read I/O request also includes enough bytes of padding 306 to make the read I/O request a standard size.

In response to the read I/O request generated by CDR driver 180, CDR agent 170 generates additional I/O requests. For each additional I/O request, CDR agent 170 encodes the I/O request according to a predetermined protocol and appends the encoded I/O request to the read I/O request. In the example of FIG. 3A, CDR agent 170 appends encoded I/O requests 308-1 to 308-M to the read I/O request.

Figure 3B:
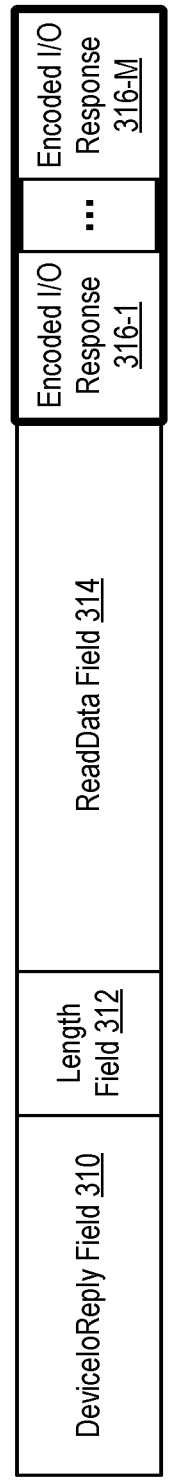
FIG. 3B is a block diagram illustrating a "merged I/O response," including responses to the read I/O request and responses to the appended I/O requests, according to embodiments.

FIG. 3B is a block diagram illustrating a merged I/O response, according to embodiments. In the example of FIG. 3B, CDR client 116 generates a read I/O response including three fields: a "deviceIoReply" field 310, a "length" field 312, and a "readData" field 314. DeviceIoReply field 310 stores header information of the response such as the ID of shared directory 122. Length field 312 stores the number of bytes read, and readData field 314 stores the data read from a file of shared directory 122. Additionally, CDR client 116 encodes responses to appended I/O requests of a merged I/O request. In the example of FIG. 3B, CDR client 116 appends encoded I/O responses 316-1 to 316-M. For example, encoded I/O response 316-1 may correspond to encoded I/O request 308-1 of FIG. 3A, and encoded I/O response 316-M may correspond to encoded I/O request 308-M of FIG. 3A.

Figure 4A:
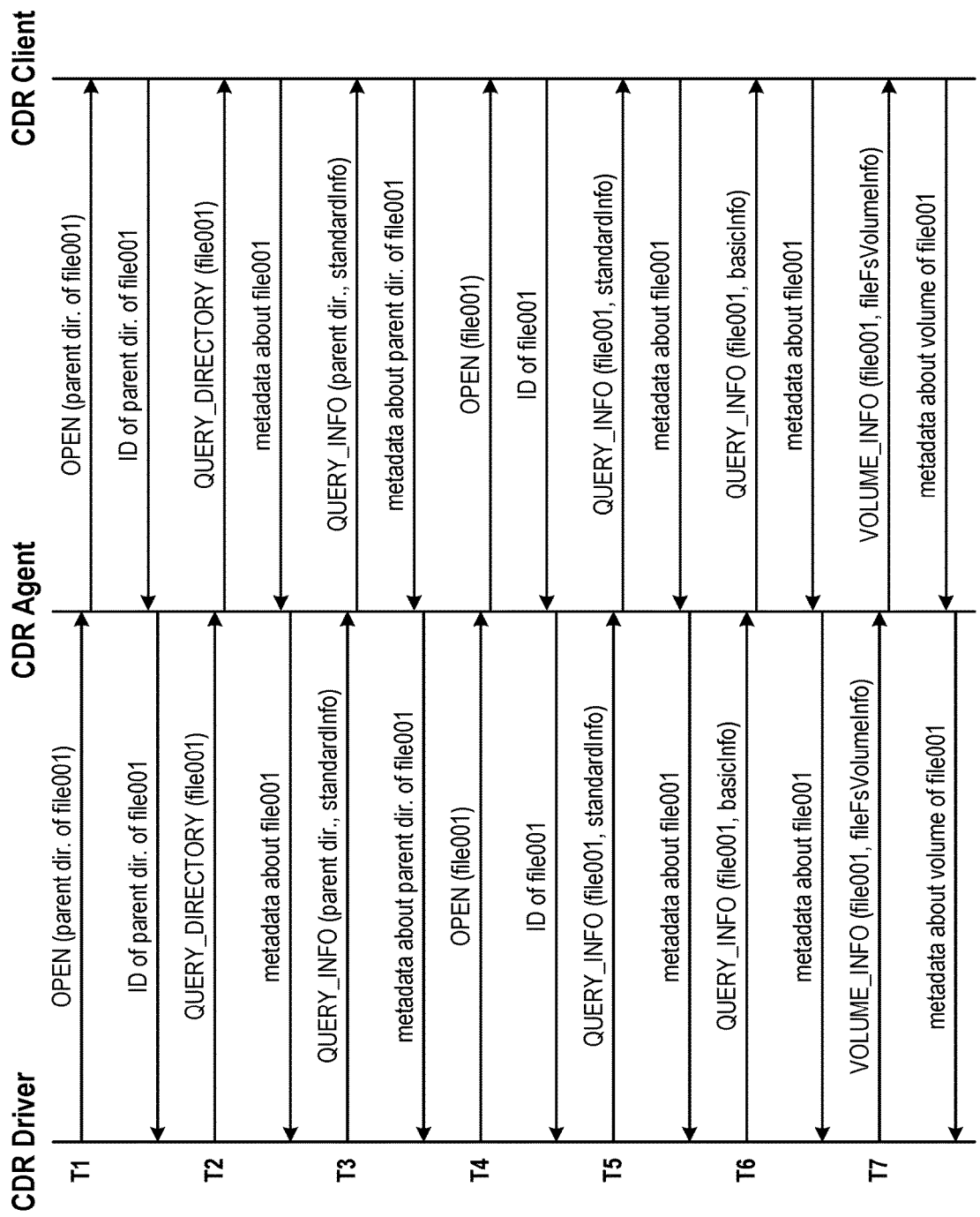
Figure 4B:
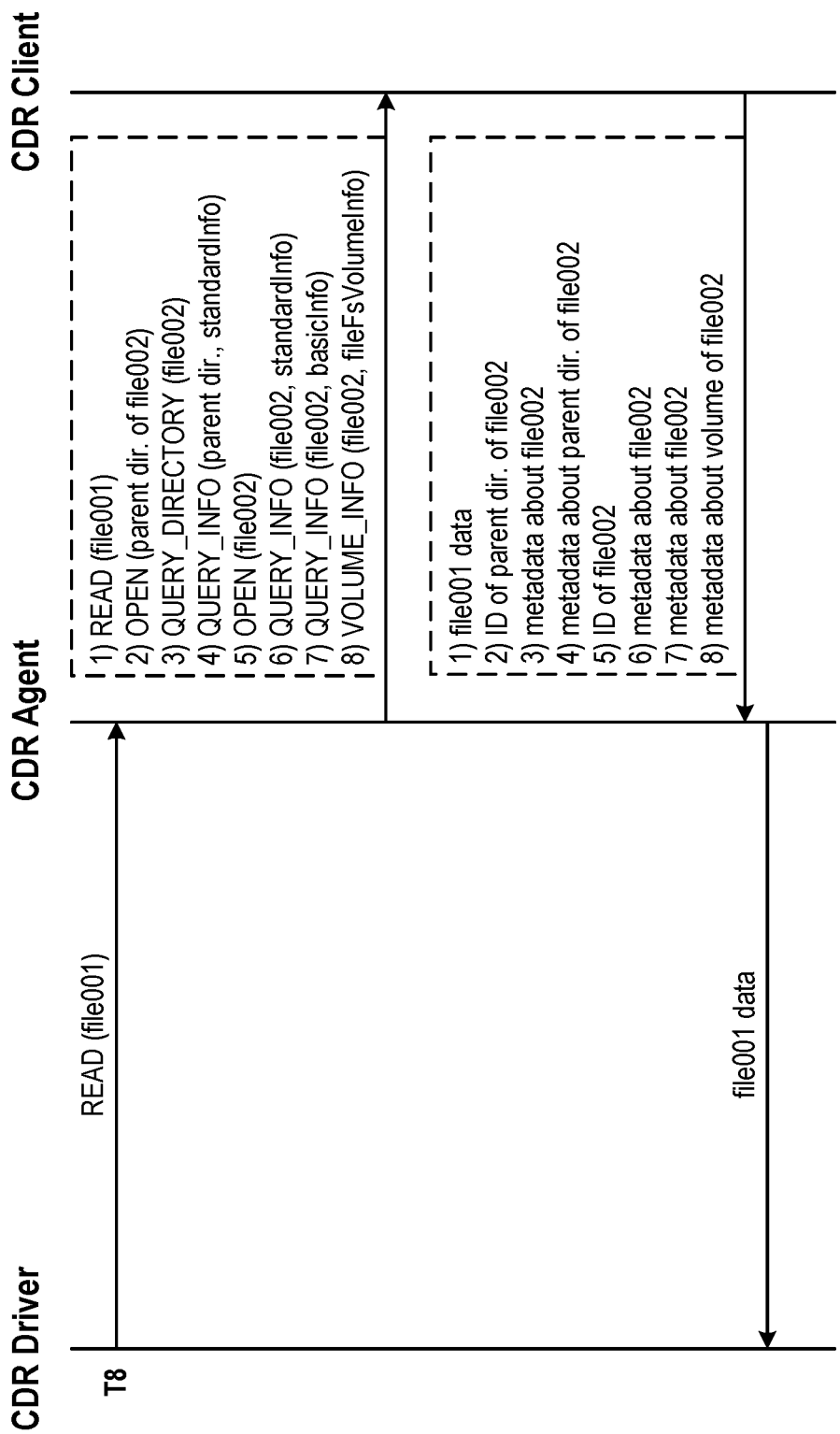

FIGS. 4A-4C are a series of sequence diagrams illustrating an example of transmitting I/O requests and responses between client computing device 110 and host server 160 for multiple files to be copied from a subdirectory of shared directory 122. FIG. 4A illustrates the transmission of pre-copy I/O requests for a first file named "file001" and the transmission of responses thereto. At a time 1, CDR driver 180 transmits an open I/O request to CDR agent 170 to open the parent directory of file001, the parent directory being a subdirectory of shared directory 122. CDR agent 170 transmits the open I/O request to CDR client 116 as a normal I/O request, and CDR client 116 executes the I/O request. As a response, CDR client 116 transmits an ID of the parent directory to CDR agent 170, which transmits the ID to CDR driver 180.

At a time 2, CDR driver 180 transmits a query directory I/O request to CDR agent 170. CDR agent 170 transmits the query directory I/O request to CDR client 116 as a normal I/O request, and CDR client 116 executes the I/O request. As a response, CDR client 116 transmits metadata about file001 to CDR agent 170, which transmits the metadata to CDR driver 180. At a time 3, CDR driver 180 transmits a query information I/O request to CDR agent 170 for standard information about the parent directory. CDR agent 170 transmits the query information I/O request to CDR client 116 as a normal I/O request, and CDR client 116 executes the I/O request. As a response, CDR client 116 transmits metadata about the parent directory to CDR agent 170, which transmits the metadata to CDR driver 180.

At a time 4, CDR driver 180 transmits an open I/O request to CDR agent 170 to open file001. CDR agent 170 transmits the open I/O request to CDR client 116 as a normal I/O request, and CDR client 116 executes the I/O request. As a response, CDR client 116 transmits an ID of file001 to CDR agent 170, which transmits the ID to CDR driver 180. At a time 5, CDR driver 180 transmits a query information I/O request to CDR agent 170 for standard information about file001. CDR agent 170 transmits the query information I/O request to CDR client 116 as a normal I/O request, and CDR client 116 executes the I/O request. As a response, CDR client 116 transmits metadata about file001 to CDR agent 170, which transmits the metadata to CDR driver 180.

At a time 6, CDR driver 180 transmits a query information I/O request to CDR agent 170 for basic information about file001. CDR agent 170 transmits the query information I/O request to CDR client 116 as a normal I/O request, and CDR client 116 executes the I/O request. As a response, CDR client 116 transmits metadata about file001 to CDR agent 170, which transmits the metadata to CDR driver 180. At a time 7, CDR driver 180 transmits a volume information I/O request to CDR agent 170 for the volume of client computing device 110 in which file001 is stored CDR agent 170 transmits the volume information I/O request to CDR client 116 as a normal I/O request, and CDR client 116 executes the I/O request. As a response, CDR client 116 transmits metadata about the volume to CDR agent 170, which transmits the metadata to CDR driver 180.

FIG. 4B illustrates the transmission of a merged I/O request and the transmission of a merged I/O response. At a time 8, CDR driver 180 transmits a read I/O request to CDR agent 170 to read data of file001, CDR driver 180 having generated the read I/O request based on responses to pre-read I/O requests for file001. Upon receiving the read I/O request, CDR agent 170 generates a merged I/O request by checking file names cache 172 to determine that the next file to copy is a file named "file002."

Accordingly, CDR agent 170 generates pre-copy I/O requests for file002, including an open I/O request to open the parent directory of file002, which may be the same as the parent directory of file001, a query directory I/O request for file002, and a query information I/O request for standard information about the parent directory. The pre-copy I/O requests also include an open request for file002, a query information I/O request for standard information about file002, a query information I/O request for basic information about file002, and a volume information I/O request for the volume of client computing device 110 in which file002 is stored, which may be the same volume in which file001 is stored. It should be noted that the parent directory and file002 are now open even though CDR driver 180 has not generated requests to open them yet. Such opening is also referred to herein as "pre-opening."

CDR agent 170 stores the parameters and paths of the pre-read I/O requests in file information cache 174 and IDs cache 176. Specifically, CDR agent 170 stores the parameters and paths of the open I/O requests in IDs cache 176 and the parameters of the other V/O requests in file information cache 174. CDR agent 170 appends the pre-I/O requests for file002 to the read I/O request for file001 and transmits the merged I/O request to CDR client 116 as a single packet. CDR client 116 executes each of the constituent I/O requests of the merged I/O request and appends responses to each of the pre-read I/O requests for file02 to a response to the read I/O request for file001.

The response to the read I/O request for file001 includes data of file001. The responses to the pre-read I/O requests for file002 include an ID of the parent directory of file002, metadata about file002, standard information metadata about the parent directory, an ID of file002, standard information metadata about file002, basic information metadata about file002, and metadata about the volume. CDR agent 116 transmits the merged I/O response to CDR agent 170 as a single packet. CDR agent 170 transmits the received data of file001 to CDR driver 180. CDR agent 170 also caches the responses to the pre-read I/O requests for file002. Specifically, CDR agent 170 stores the IDs of the parent directory and file002 in IDs cache 176 and the other responses in file information cache 174.

FIG. 4C illustrates the transmission of pre-copy I/O requests for file002 and the transmission of responses thereto. At a time 9, CDR driver 180 transmits an open I/O request to CDR agent 170 to open the parent directory of file002. CDR agent 170 retrieves the response to the open I/O request, which is the ID of the parent dir., from IDs cache 176, and transmits the ID to CDR driver 180. At a time 10, CDR driver 180 transmits a query directory I/O request to CDR agent 170. CDR agent 170 retrieves the response to the query directory I/O request, which is metadata about file002, from file information cache 174, and transmits the metadata to CDR driver 180. At a time 11, CDR driver 180 transmits a query information I/O request to CDR agent 170 for standard information about the parent directory. CDR agent 170 retrieves the response to the query information I/O request, which is standard information metadata about the parent directory, from file information cache 174, and transmits the metadata to CDR driver 180.

At a time 12, CDR driver 180 transmits an open I/O request to CDR agent 170 to open file002. CDR agent 170 retrieves the response to the open I/O request, which is the ID of file002, from IDs cache 176, and transmits the ID to CDR driver 180. At a time 13, CDR driver 180 transmits a query information I/O request to CDR agent 170 for standard information about file002. CDR agent 170 retrieves the response to the query information I/O request, which is standard information metadata about file002, from file information cache 174, and transmits the metadata to CDR driver 180.

At a time 14, CDR driver 180 transmits a query information I/O request to CDR agent 170 for basic information about file002. CDR agent 170 retrieves the response to the query information I/O request, which is basic information metadata about file002, from file information cache 174, and transmits the metadata to CDR driver 180. At a time 15, CDR driver 180 transmits a volume information I/O request to CDR agent 170 for the volume of client computing device 110 in which file002 is stored. CDR agent 170 retrieves the response to the volume information I/O request, which is metadata about the volume, from file information cache 174, and transmits the metadata to CDR driver 180.

Figure 5:
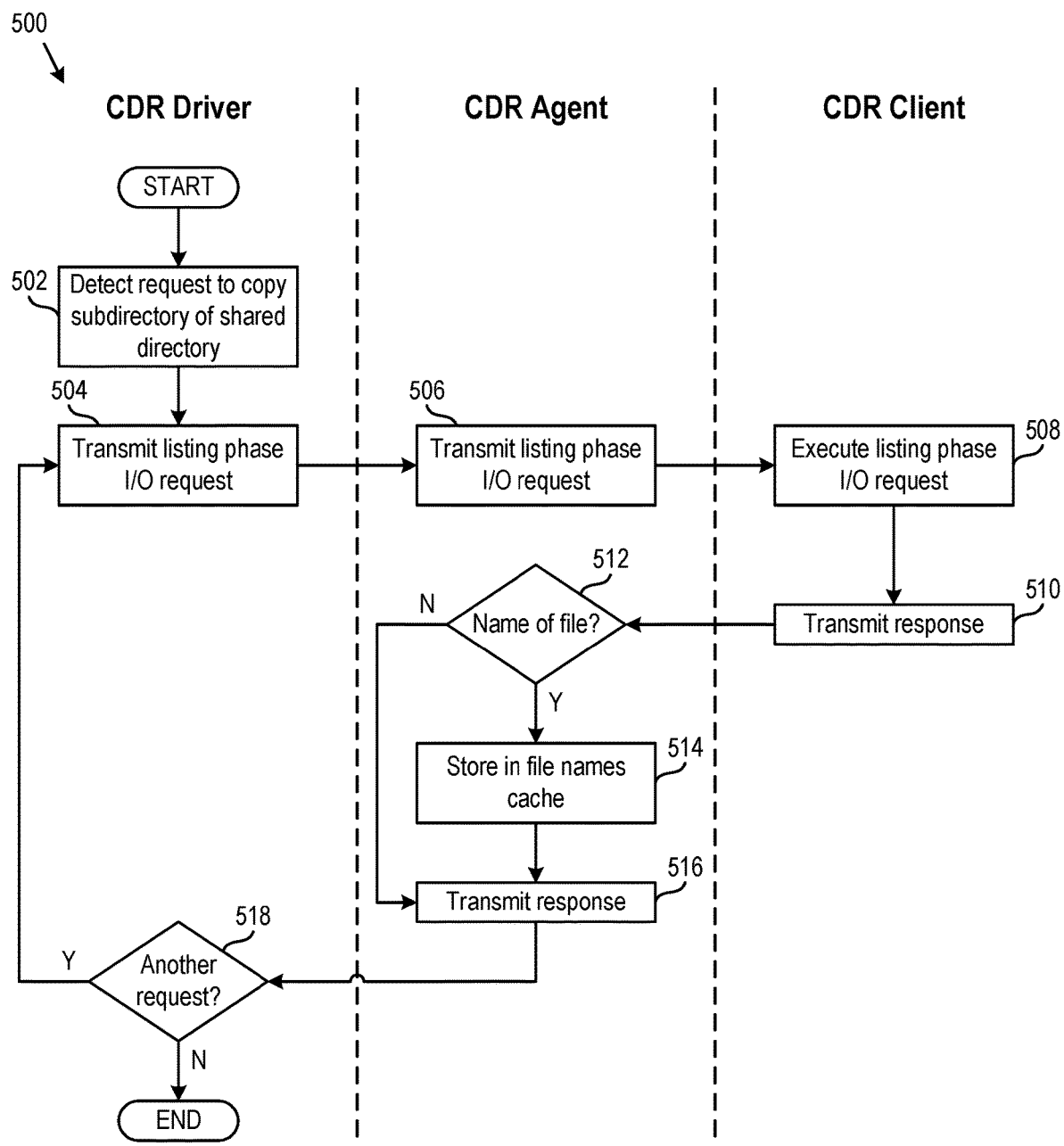
FIG. 5 is a flow diagram of steps performed by CDR software of the client computing device and the host server to carry out a method of performing I/O requests of a listing phase, according to an embodiment.

FIG. 5 is a flow diagram of steps performed by CDR software of client computing device 110 and host server 160 to carry out a method 500 of performing I/O requests of a listing phase, according to an embodiment. At step 502, CDR driver 180 detects a request to copy a subdirectory of shared directory 122. For example, the user may have "dragged and dropped" the subdirectory to one of directories 184. At step 504, CDR driver 180 generates a listing phase I/O request and transmits the I/O request to CDR agent 170. For example, the I/O request may be an open I/O request for the subdirectory or a query directory request for one of the files therein.

At step 506, CDR agent 170 transmits the I/O request to CDR client 116. At step 508, CDR client 116 executes the I/O request. At step 510, CDR client 116 transmits a response to the I/O request to CDR agent 170. At step 512, if the response includes the name of a file, method 500 moves to step 514, and CDR agent 170 stores the name in file names cache 172 in association with a thread ID of the I/O request and a name of the file's parent directory. Otherwise, if the response does not include the name of a file, method 500 moves directly from step 512 to step 516. At step 516, CDR agent 170 transmits the response to CDR driver 180. At step 518, if there is another I/O request to generate for the listing phase, method 500 returns to step 504, and CDR driver 180 generates another listing phase I/O request to transmit to CDR agent 170. Otherwise, if there are no more I/O requests generate, the listing phase is complete, and method 500 ends.

Figure 6:
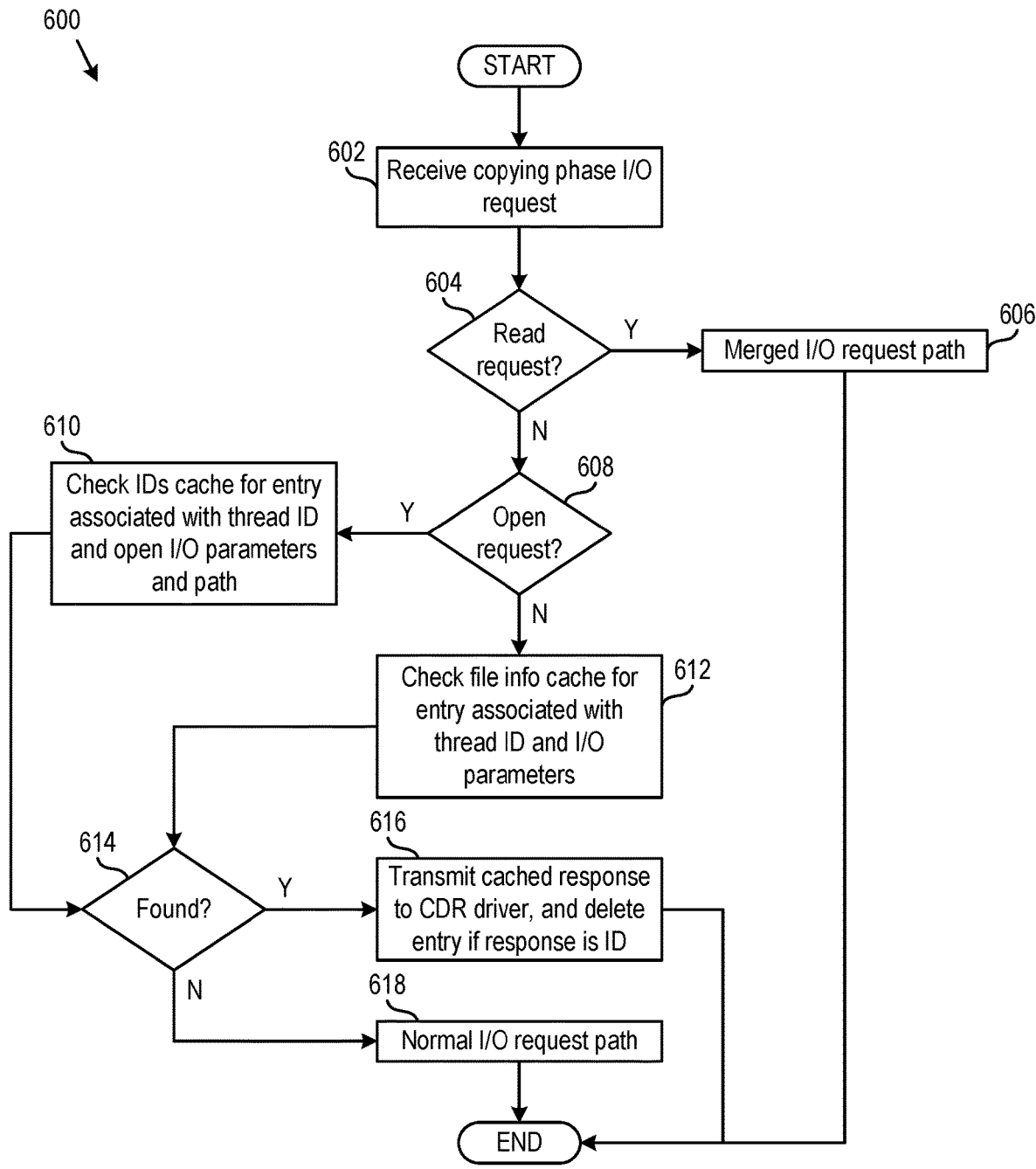
FIG. 6 is a flow diagram of steps performed by the CDR software of the host server to carry out a method of handling an I/O request of a copying phase, according to an embodiment.

FIG. 6 is a flow diagram of steps performed by CDR agent 170 to carry out a method 600 of handling an I/O request of a copying phase for copying a subdirectory of shared directory 122, according to an embodiment. Method 600 is performed after the listing phase of method 500 of FIG. 5. At step 602, CDR agent 170 receives an I/O request from CDR driver 180, which generated the request. At step 604, if the I/O request is a read I/O request, method 600 moves to step 606. At step 606, CDR agent 170 follows a merged I/O request path, as discussed further below in conjunction with FIGS. 7 and 8, and method 600 ends. Returning to step 604, if the I/O request is not a read I/O request, method 600 moves to step 608.

At step 608, if the I/O request is a request to open either a subdirectory of shared directory 122 or a file, method 600 moves to step 610, and CDR agent 170 checks IDs cache 176 for a response to the open I/O request. Specifically, CDR agent 170 receives a thread ID for the I/O request from thread driver 182, and CDR agent 170 checks IDs cache 176 for an entry associated with the thread ID, parameters, and path of the open I/O request. Otherwise, if the I/O request is not an open I/O request, method 600 moves to step 612, and CDR agent 170 checks file information cache 174 for a response to the I/O request. Specifically, CDR agent 170 receives a thread ID for the I/O request from thread driver 182, and CDR agent 170 checks file information cache 174 for an entry associated with the thread ID and the parameters of the I/O request.

At step 614, if CDR agent 170 found a response to the I/O request in either IDs cache 176 at step 610 or file information cache 174 at step 612, method 600 moves to step 616. At step 616, CDR agent 170 transmits the cached response to CDR driver 180 to be used thereby, e.g., to generate another I/O request. Additionally, if the cached response is an ID of IDs cache 176, CDR agent 170 deletes the corresponding entry of IDs cache 176 because the ID corresponds to a file or subdirectory that has been "pre-opened" in response to an open I/O request of a merged I/O request. Such an ID is deleted to prevent the ID being retrieved again in response a future open I/O request that is unrelated to the pre-opening of the file or subdirectory, which would be a conflict condition. After step 616, method 600 ends. Returning to step 614, if CDR agent 170 did not find the response, method 600 moves to step 618. At step 618, CDR agent 170 follows a normal I/O request path, as discussed further below in conjunction with FIG. 9, and method 600 ends.

Figure 7:
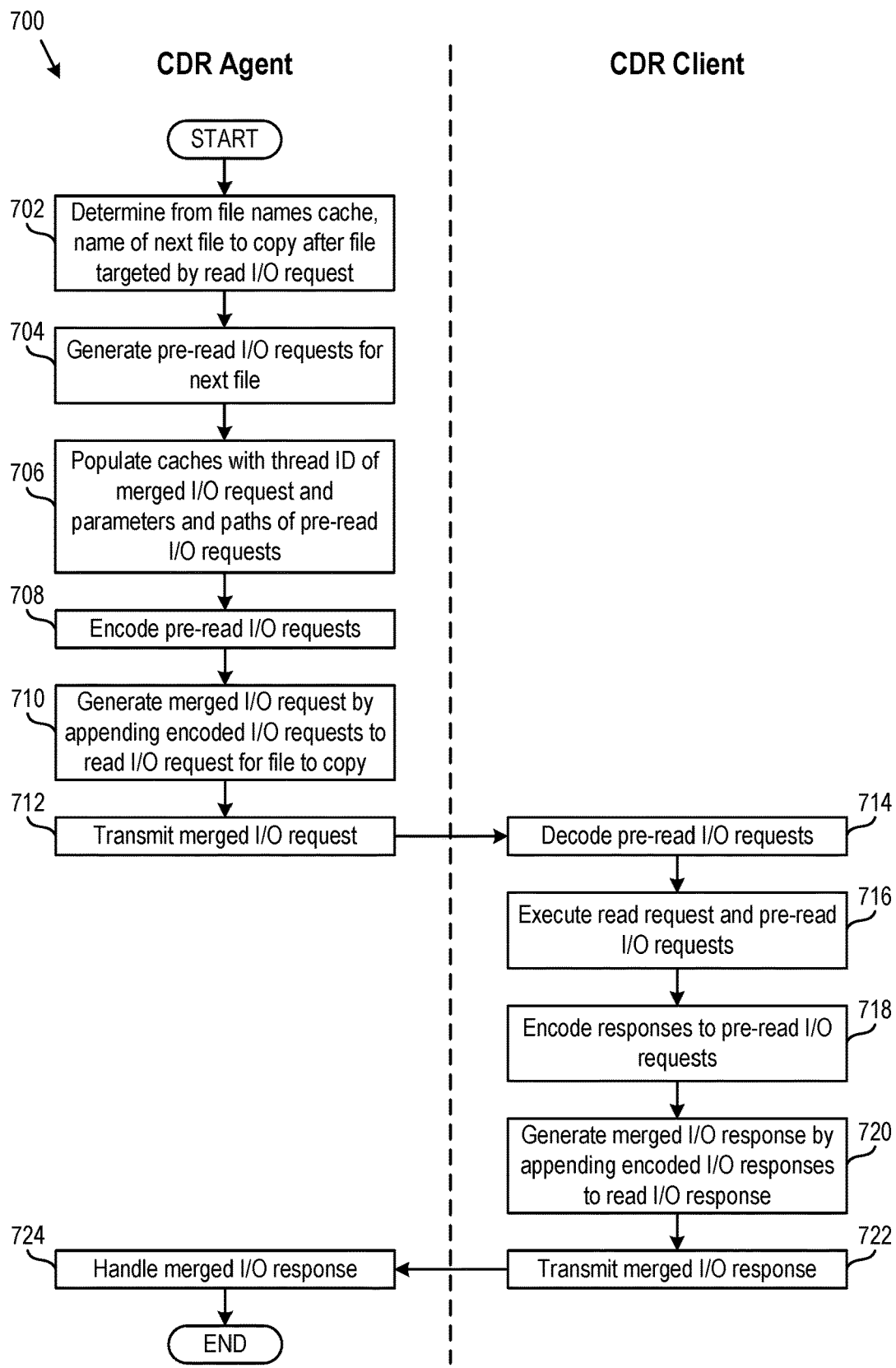
FIG. 7 is a flow diagram of steps performed by the CDR software of the client computing device and the host server to carry out a method of performing a merged I/O request of the copying phase, according to an embodiment.

FIG. 7 is a flow diagram of steps performed by CDR agent 170 and CDR client 116 to carry out a method 700 of performing a merged I/O request of the copying phase, according to an embodiment. Method 700 is triggered upon CDR agent 170 receiving a read I/O request from CDR driver 180 for a file to be copied, CDR driver 180 having generated the read I/O request based on responses to pre-read I/O requests for the file to be copied. At step 702, CDR agent 170 checks file names cache 172 to determine the name of a next file to be copied after the file targeted by the read I/O request. Specifically, CDR agent 170 locates an entry of file names cache 172 corresponding to a thread ID received from thread driver 182 and the name of the subdirectory of shared directory 122 in which the file targeted by the read I/O request is stored. The name of the subdirectory is determined from a path targeted by the read I/O request. Within the located entry, CDR agent 170 determines from the ordered list of file names that there is a next file name after the name of the targeted file.

At step 704, CDR agent 170 generates pre-read I/O requests for the next file to be copied such as those illustrated in FIG. 4B for file002. At step 706, CDR agent 170 populates file information cache 174 and IDs cache 176 with a thread ID of the merged I/O request, which is received from thread driver 182, and the parameters and paths of the pre-read I/O requests. Specifically, CDR agent 170 stores the parameters and paths of open I/O requests in IDs cache 176 and the parameters of other pre-read I/O requests in file information cache 174. At step 708, CDR agent 170 encodes each of the pre-read I/O requests according to a predetermined protocol. At step 710, CDR agent 170 generates a merged I/O request by appending the encoded pre-read I/O requests for the next file to the read I/O request. At step 712, CDR agent 170 transmits the merged I/O request to CDR client 116.

At step 714, CDR client 116 decodes each of the pre-read I/O requests for the next file. At step 716, CDR client 116 executes the read I/O request and each of the decoded pre-read I/O requests. At step 718, CDR client 116 encodes responses to each of the pre-read I/O requests. At step 720, CDR client 116 generates a merged I/O response by appending the encoded responses to the pre-read I/O requests to a response to the read I/O request, which includes data of the file targeted by the read I/O request.

At step 722, CDR client 116 transmits the merged I/O response to CDR agent 170. At step 724, CDR agent 170 handles the merged I/O response, as discussed further below in conjunction with FIG. 8. After step 724, method 700 ends.

Method 700 is discussed with respect to embodiments in which the I/O requests appended to read I/O requests are pre-read I/O requests for a next file to be copied. It should be noted that I/O requests appended to a read I/O request may also include I/O requests for the same file targeted by the read I/O request.

Figure 8:
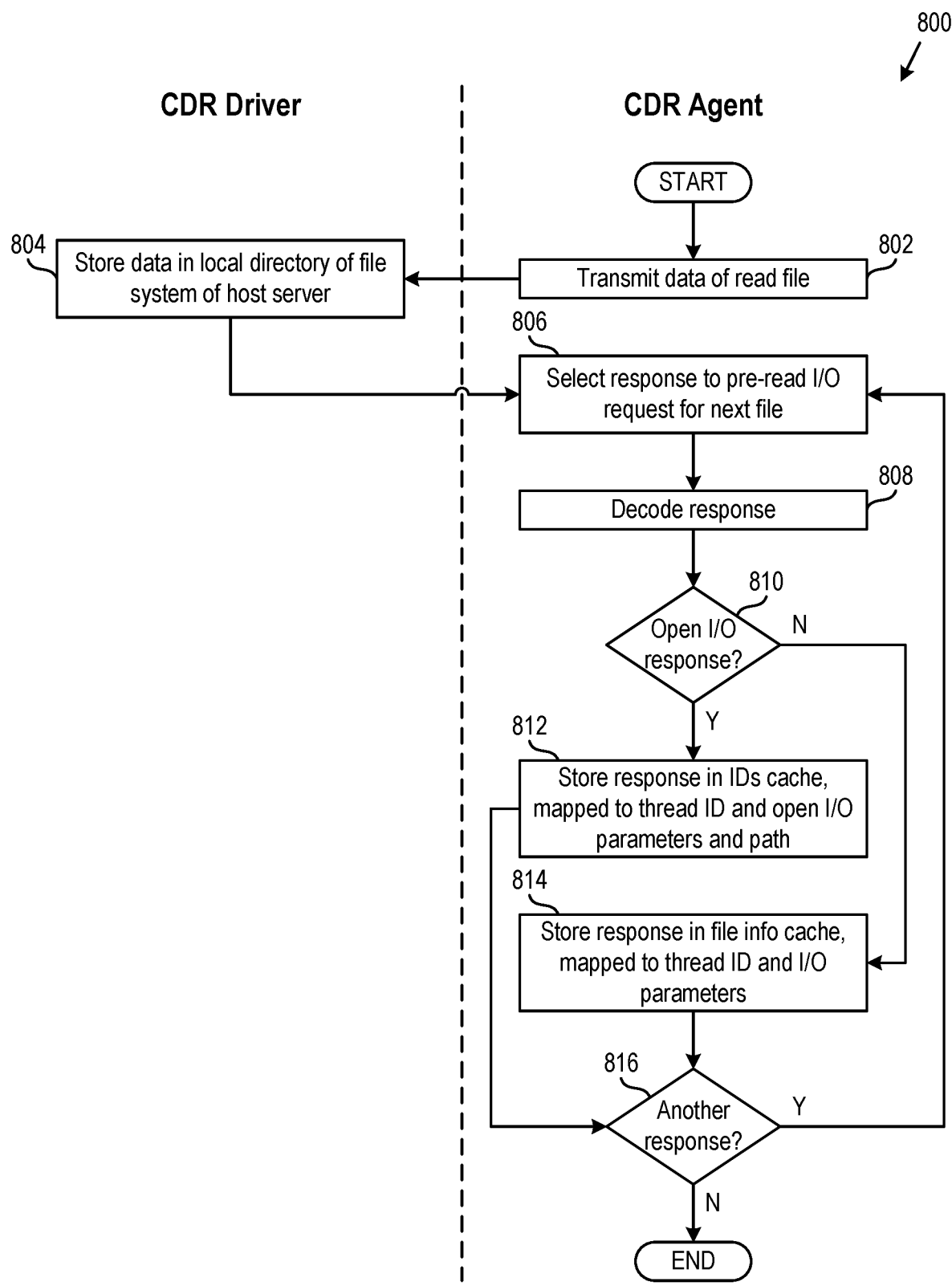
FIG. 8 is a flow diagram of steps performed by the CDR software of the host server to carry out a method of performing I/O requests based on a merged I/O response, according to an embodiment.

FIG. 8 is a flow diagram of steps performed by the CDR software of host server 160 to carry out a method 800 of handling a merged I/O response, according to an embodiment. At step 802, CDR agent 170 transmits data read from a file of shared directory 122 to CDR driver 180. CDR agent 170 retrieves this data from readData field 314, illustrated in FIG. 3B. At step 804, CDR driver 180 stores the data in a file of one of directories 184. At step 806, CDR agent 170 selects a response to a pre-read I/O request for the next file to be copied, from the merged I/O response. The response is encoded according to a predetermined protocol, and CDR agent 170 retrieves the response from a field after readData field 314, as illustrated in FIG. 3B.

At step 808, CDR agent 170 decodes the response. At step 810, if the decoded response is a response to open I/O request and thus includes an ID of a file or subdirectory of shared directory 122, method 800 moves to step 812. At step 812, CDR agent 170 stores the ID in IDs cache 176. Specifically, CDR agent 170 receives a thread ID for the response from thread driver 182. CDR agent 170 then caches the ID in an entry of IDs cache 176 corresponding to the received thread ID and the parameters and path of the associated open I/O request.

Returning to step 810, if the decoded response is not a response to an open I/O request and thus includes metadata other than an ID of a file or subdirectory, method 800 moves to step 814. At step 814, CDR agent 170 stores the metadata in file information cache 174. Specifically, CDR agent 170 receives a thread ID for the response from thread driver 182. CDR agent 170 then caches the metadata in an entry of file information cache 174 corresponding to the received thread ID and the parameters of the associated I/O request.

At step 816, if there is another appended I/O response in the merged I/O response, method 800 returns to step 806, and CDR agent 170 selects another I/O response. Otherwise, if there are no more appended I/O responses in the merged I/O response, method 800 ends. Method 800 is discussed with respect to embodiments in which the I/O responses appended to read I/O responses are responses to pre-read I/O requests for a next file to be copied. It should be noted that I/O responses appended to a read I/O response may also include responses to I/O requests for the same file associated with the read I/O response.

Figure 9:
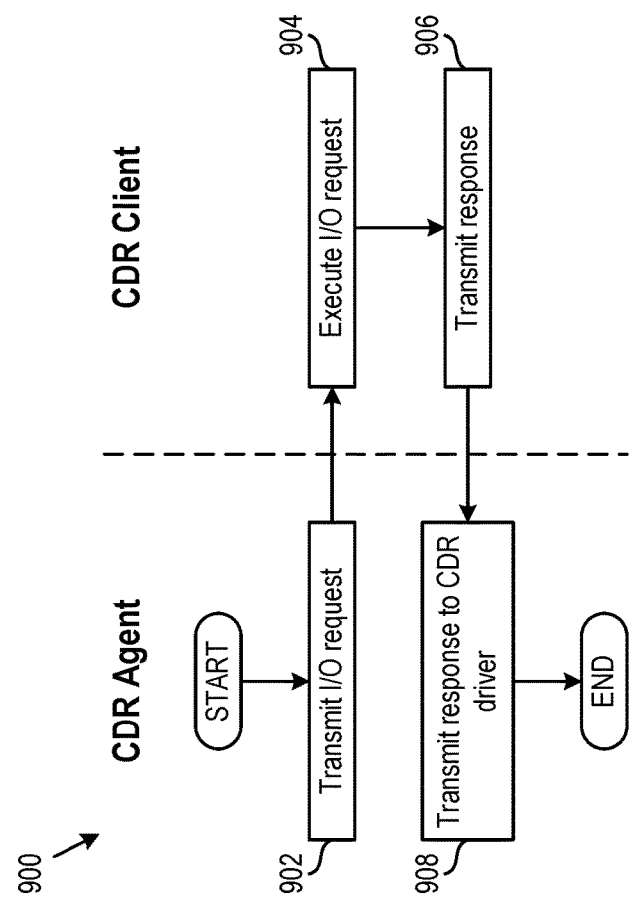
FIG. 9 is a flow diagram of steps performed by the CDR software of the client computing device and the host server to carry out a method of performing a normal I/O request based on information stored in the client computing device, according to an embodiment.

FIG. 9 is a flow diagram of steps performed by CDR agent 170 and CDR client 116 to carry out a method 900 of performing a normal I/O request based on information stored in client computing device 110, according to an embodiment. Method 900 is triggered by CDR agent 170 receiving an I/O request from CDR driver 180 for which a response is not cached. At step 902, CDR agent 170 transmits the I/O request to CDR client 116. At step 904, CDR client 116 executes the I/O request. At step 906, CDR client 116 transmits a response to the I/O request to CDR agent 170. At step 908, CDR agent 170 transmits the response to CDR driver 180 to be used thereby, e.g., to generate another I/O request. After step 908, method 900 ends.

Figure 10:
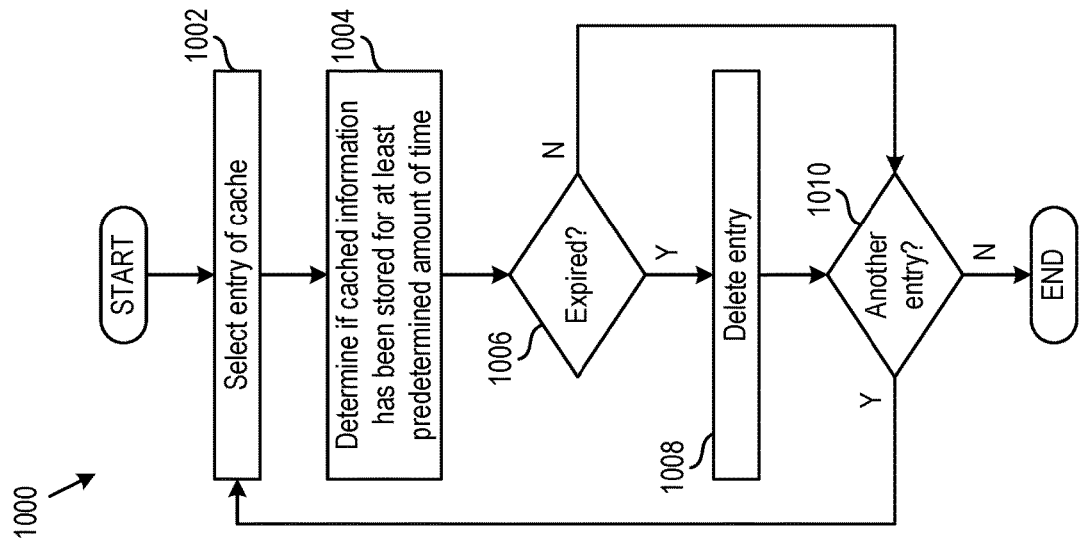
FIG. 10 is a flow diagram of steps performed by the CDR software of the host server to carry out a method of deleting cached information that has expired, according to an embodiment.

FIG. 10 is a flow diagram of steps performed by CDR agent 170 to carry out a method 1000 of deleting cached information that has expired, according to an embodiment. At step 1002, CDR agent 170 selects an entry of one of file information cache 174 and IDs cache 176. At step 1004, CDR agent 170 determines if information cached at the entry has been stored for at least a predetermined amount of time, e.g., by comparing a timestamp at the entry to the current time.

At step 1006, if the information has expired because it has been stored for at least the predetermined amount of time, method 1000 moves to step 1008, and CDR agent 170 deletes the entry from the cache. Otherwise, if the amount of time in which the information has been stored is less than the predetermined amount of time, method 1000 moves directly from step 1006 to step 1010. At step 1010, if there is another entry of the one of file information cache 174 and IDs cache 176 to analyze, method 1000 returns to step 1002, and CDR agent 170 selects another entry. Otherwise, if there is not another entry to analyze, method 1000 ends.

Figure 11:
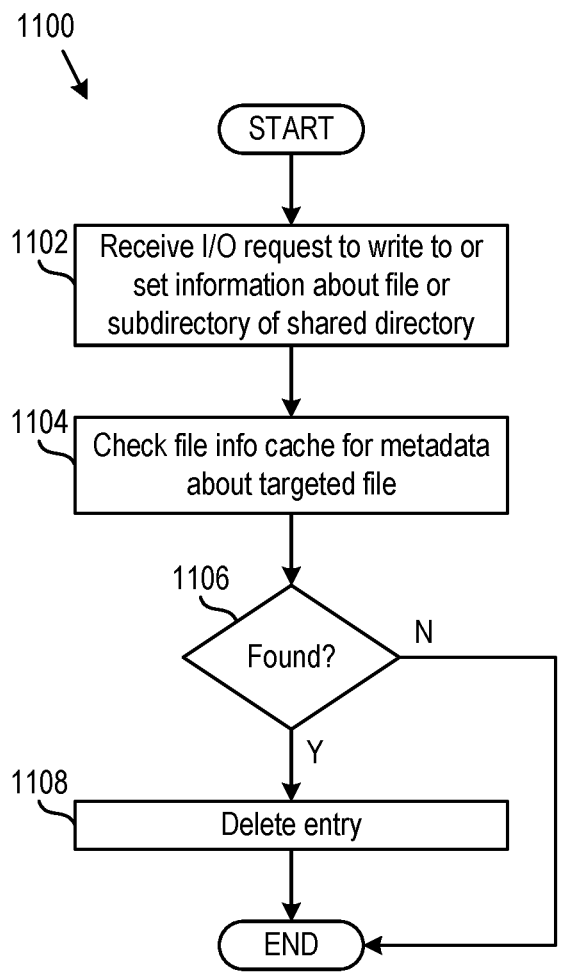
FIG. 11 is a flow diagram of steps performed by the CDR software of the host server to carry out a method of deleting cached information that is at risk of conflicting with data or metadata stored in the client computing device, according to an embodiment.

FIG. 11 is a flow diagram of steps performed by CDR agent 170 to carry out a method 1100 of deleting cached information from file information cache 174 that is at risk of conflicting with metadata stored in shared directory 122 at client computing device 110, according to an embodiment. At step 1102, CDR agent 170 receives an I/O request from CDR driver 180 to write to a file of shared directory 122 or to "set information" about a file or subdirectory of shared directory 122, i.e., to update metadata about the file or subdirectory. At step 1104, CDR agent 170 checks file information cache 174 to determine if metadata about the file or subdirectory is stored therein. Specifically, CDR agent 170 searches for an entry corresponding to a thread ID received from thread driver 182 and the parameters of the I/O request. At step 1106, if CDR agent 170 finds metadata about the file or subdirectory, method 1100 moves to step 1108, and CDR agent 170 deletes the entry that includes the metadata. After step 1108, method 1100 ends. Returning to step 1106, if CDR agent 170 does not find metadata about the file or subdirectory, method 1100 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of copying at least first and second files stored in a client computing device to a host server that is hosting a remote desktop accessed by the client computing device, comprising:
    transmitting pre-read input/output (I/O) requests for the first file from the host server to the client computing device;
    generating at the host server a first read I/O request for data of the first file based on responses to the pre-read I/O requests for the first file, received from the client computing device;
    transmitting a merged I/O request that includes the first read I/O request for data of the first file and pre-read I/O requests for the second file from the host server to the client computing device;
    generating at the host server a second read I/O request for data of the second file based on responses to the pre-read I/O requests for the second file, received from the client computing device;

transmitting the second read I/O request for data of the second file from the host server to the client computing device; and storing at the host server the data of the first file and the data of the second file, received in response to the first read I/O request and the second read I/O request, respectively.

2. The method of claim 1, wherein the client computing device stores the first and second files in a directory for which the host server stores names of files therein, and the host server stores the data of the first file and the data of the second file in files of a local directory of the host server.

3. The method of claim 2, further comprising:
before the transmitting of the pre-read I/O requests for the first file from the host server to the client computing device, generating at the host server I/O requests for a plurality of the names of the files stored in the directory of the client computing device, transmitting the I/O requests for the plurality of the names of the files from the host server to the client computing device, and storing the plurality of the names in a cache of the host server based on responses to the I/O requests for the plurality of the names of the files, received from the client computing device.

4. The method of claim 3, further comprising:
upon locating a name of the second file in the cache of the host server, generating the pre-read I/O requests for the second file, encoding each of the pre-read I/O requests for the second file, and appending the first read I/O request with the encoded pre-read I/O requests for the second file to generate the merged I/O request.

5. The method of claim 1, further comprising:
storing the responses to the pre-read I/O requests for the second file received from the client computing device in a cache, wherein the generating of the second read I/O request is based on responses to the pre-read I/O requests for the second file retrieved from the cache.

6. The method of claim 5, wherein in the cache, a thread of the first read I/O request is mapped to the responses to the pre-read I/O requests for the second file.

7. The method of claim 5, wherein the cache stores identifiers of files stored in the client computing device, and the pre-read I/O requests for the second file include a request to open the second file.

8. The method of claim 5, further comprising:
determining that information stored in an entry of the cache has been stored in the cache for at least a predetermined amount of time; and
based on the determination that the information has been stored for at least the predetermined amount of time, deleting the entry of the cache.

9. The method of claim 5, wherein the cache stores metadata about files stored in the client computing device and metadata about a directory and a volume of the client computing device, and the pre-read I/O requests for the second file include queries for metadata about the second file, the directory, and the volume.

10. The method of claim 9, further comprising:
receiving one of an I/O request to write to a third file stored in the client computing device and an I/O request to set information about the third file;
determining that metadata about the third file is stored in the cache; and
based on the receiving of the one of the U/O requests, deleting the metadata about the third file from the cache.

11. The method of claim 1, wherein the second read I/O request is transmitted from the host server to the client computing device as part of another merged I/O request that includes pre-read I/O requests for a third file stored in the client computing device.

12. A non-transitory computer-readable medium comprising instructions that are executable in a remote desktop system, wherein the instructions when executed cause the remote desktop system to carry out a method of copying at least first and second files stored in a client computing device to a host server that is hosting a remote desktop accessed by the client computing device, the method comprising:
transmitting pre-read input/output (I/O) requests for the first file from the host server to the client computing device;
generating at the host server a first read I/O request for data of the first file based on responses to the pre-read I/O requests for the first file, received from the client computing device;
transmitting a merged I/O request that includes the first read I/O request for data of the first file and pre-read I/O requests for the second file from the host server to the client computing device;
generating at the host server a second read I/O request for data of the second file based on responses to the pre-read I/O requests for the second file, received from the client computing device;
transmitting the second read I/O request for data of the second file from the host server to the client computing device; and
storing at the host server the data of the first tile and the data of the second file, received in response to the first read I/O request and the second read I/O request, respectively.

13. The non-transitory computer-readable medium of claim 12, wherein the client computing device stores the first and second files in a directory for which the host server stores names of files therein, and the host server stores the data of the first file and the data of the second file in files of a local directory of the host server.

14. The non-transitory computer-readable medium of claim 13, further comprising:
before the transmitting of the pre-read I/O requests for the first file from the host server to the client computing device, generating at the host server I/O requests for a plurality of the names of the files stored in the directory of the client computing device, transmitting the I/O requests for the plurality of the names of the files from the host server to the client computing device, and storing the plurality of the names in a cache of the host server based on responses to the I/O requests for the plurality of the names of the files, received from the client computing device.

15. The non-transitory computer-readable medium of claim 14, further comprising:
upon locating a name of the second file in the cache of the host server, generating the pre-read I/O requests for the second file, encoding each of the pre-read I/O requests for the second file, and appending the first read I/O request with the encoded pre-read I/O requests for the second file to generate the merged I/O request.

16. The non-transitory computer-readable medium of claim 12, further comprising:
storing the responses to the pre-read I/O requests for the second file received from the client computing device in a cache, wherein the generating of the second read I/O request is based on responses to the pre-read I/O requests for the second file retrieved from the cache.

17. The non-transitory computer-readable medium of claim 16, wherein in the cache, a thread of the first read I/O request is mapped to the responses to the pre-read I/O requests for the second file.

18. The non-transitory computer-readable medium of claim 16, wherein the cache stores identifiers of files stored in the client computing device, and the pre-read I/O requests for the second file include a request to open the second file.

19. The non-transitory computer-readable medium of claim 16, further comprising:
determining that information stored in an entry of the cache has been stored in the cache for at least a predetermined amount of time; and
based on the determination that information has been stored for at least the predetermined amount of time, deleting the entry of the cache.

20. The non-transitory computer-readable medium of claim 16, wherein the cache stores metadata about files stored in the client computing device and metadata about a directory and a volume of the client computing device, and the pre-read I/O requests for the second file include queries for metadata about the second file, the directory, and the volume.

21. The non-transitory computer-readable medium of claim 12, further comprising:
receiving one of an I/O request to write to a third file stored in the client computing device and an I/O request to set information about the third file;
determining that metadata about the third file is stored in the cache; and
based on the receiving of the one of the I/O requests, deleting the metadata about the third file from the cache.

22. The non-transitory computer-readable medium of claim 12, wherein the second read I/O request is transmitted from the host server to the client computing device as part of another merged I/O request that includes pre-read I/O requests for a third file stored in the client computing device.

23. A remote desktop system comprising:
a client computing device storing a first file and a second file; and
a host server configured to:
transmit pre-read input/output (I/O) requests for the first file to the client computing device;
generate a first read I/O request for data of the first file based on responses to the pre-read I/O requests for the first file, received from the client computing device;
transmit a merged I/O request that includes the first read I/O request for data of the first file and pre-read I/O requests for the second file to the client computing device;
generate a second read I/O request for data of the second file based on responses to the pre-read I/O requests for the second file, received from the client computing device;
transmit the second read I/O request for data of the second file to the client computing device; and
store the data of the first file and the data of the second file, received in response to the first read I/O request and the second read I/O request, respectively.

24. The remote desktop system of claim 23, wherein the client computing device stores the first and second files in a directory for which the host server stores names of files therein, and the host server stores the data of the first file and the data of the second file in files of a local directory of the host server.

25. The remote desktop system of claim 24, wherein the host server is further configured to:
before the transmitting of the pre-read I/O requests for the first file from the host server to the client computing device, generate I/O requests for a plurality of the names of the files stored in the directory of the client computing device, transmit the I/O requests for the plurality of the names of the files to the client computing device, and store the plurality of the names in a cache of the host server based on responses to the I/O requests for the plurality of the names of the files, received from the client computing device.

26. The remote desktop system of claim 25, wherein the host server is further configured to:
upon locating a name of the second file in the cache of the host server, generate the pre-read I/O requests for the second file, encode each of the pre-read I/O requests for the second file, and append the first read I/O request with the encoded pre-read I/O requests for the second file to generate the merged I/O request.

27. The remote desktop system of claim 23, wherein the host server is further configured to:
store the responses to the pre-read I/O requests for the second file received from the client computing device in a cache, wherein the generating of the second read I/O request is based on responses to the pre-read I/O requests for the second file retrieved from the cache.

28. The remote desktop system of claim 27, wherein in the cache, a thread of the first read I/O request is mapped to the responses to the pre-read I/O requests for the second file.

29. The remote desktop system of claim 27, wherein the cache stores identifiers of files stored in the client computing device, and the pre-read I/O requests for the second file include a request to open the second file.

30. The remote desktop system of claim 27, wherein the host server is further configured to:
determine that information stored in an entry of the cache has been stored in the cache at least a predetermined amount of time; and
based on the determination that the information has been stored for at least the predetermined amount of time, delete the entry of the cache.

31. The remote desktop system of claim 27, wherein the cache stores metadata about files stored in the client computing device and metadata about a directory and a volume of the client computing device, and the pre-read I/O requests for the second file include queries for metadata about the second file, the directory, and the volume.

32. The remote desktop system of claim 31, wherein the host server is further configured to;
receive one of an I/O request to write to a third file stored in the client computing device and an I/O request to set information about the third file;
determine that metadata about the third file is stored in the cache; and
based on the receiving of the one of the I/O requests, delete the metadata about the third file from the cache.

33. The remote desktop system of claim 23, wherein the second read I/O request is transmitted to the client computing device as part of another merged I/O request that includes pre-read I/O requests for a third file stored in the client computing device.

* * * * *